US005237482A

United States Patent [19]

Osterhout et al.

[11] Patent Number: 5,237,482

[45] Date of Patent: Aug. 17, 1993

[54] HIGH VOLTAGE SURGE ARRESTER WITH FAILED SURGE ARRESTER SIGNALING DEVICE

[75] Inventors: Joseph C. Osterhout, Lockport; Steven P. Hensley, Wheeling, both of Ill.

[73] Assignee: Joslyn Corporation, Chicago, Ill.

[21] Appl. No.: 819,765

[22] Filed: Jan. 13, 1992

Related U.S. Application Data

[63] Continuation-in-part of Ser. No. 728,103, Jul. 10, 1991, abandoned.

[51] Int. Cl.[5] .................................................. H02H 9/04

[52] U.S. Cl. ...................................... 361/117; 361/127; 361/132

[58] Field of Search ................... 361/55, 56, 117, 120, 361/127, 131, 132; 337/30, 32; 340/637

[56] References Cited

U.S. PATENT DOCUMENTS

| | | | |
|---|---|---|---|
| 3,631,323 | 12/1971 | Dittman | 361/127 |
| 4,788,622 | 11/1988 | Cinquin | 361/127 |
| 5,113,306 | 5/1992 | Veverka et al. | 361/127 |

*Primary Examiner*—Todd E. DeBoer

*Attorney, Agent, or Firm*—Marshall, O'Toole, Gerstein, Murray & Borun

[57] ABSTRACT

A high voltage surge arrester includes first, second and third terminals. Arrester components, including one or more arrester valve blocks, are serially disposed in an insulating arrester housing between the first and second terminals. A first current carrying conductor is connected between the second and third terminals by way of a disconnector. If the arrester fails, the disconnector will disengage the first current carrying conductor to provide a visible indication that the arrester has failed. At the same time, a second current carrying conductor then reestablishes the connection between the second and third terminals. Thus, a current carrying conductive path is maintained between the first and third terminals.

32 Claims, 5 Drawing Sheets

HIGH VOLTAGE SURGE ARRESTER WITH FAILED SURGE ARRESTER SIGNALING DEVICE

BACKGROUND OF THE INVENTION

This present application is a continuation-in-part of application Ser. No. 07/728,103, filed on Jul. 10, 1991, now abandoned.

The present invention relates to high voltage surge arresters for shunting overvoltage surges on high voltage electric power distribution lines to ground and, more particularly, to an arrangement which will provide a signal that the surge arrester has failed and which will, at the same time, maintain a current carrying conductive path between the high voltage electric power distribution lines and system ground.

Surge arresters are commonly used in high voltage (for example, from approximately 3000 volts through 35000 volts or higher) electric power distribution systems for shunting to system ground overvoltage surges (which may be produced by lightning strikes, for example), thereby to protect transformers and other equipment of the electric power distribution system as well as the equipment of residential, commercial and industrial customers connected to the electric power distribution system.

It has been a common, prior art practice to provide a ground lead disconnector, typically an explosive disconnector, which will separate the ground lead from the arrester if the arrester fails, as is well known in the art. The separated ground lead not only disconnects the failed arrester from the power system, but also provides a visible signal to a utility linesman that the arrester has failed.

A consequence of this protection arrangement is that the protected equipment no longer has protection after the failed arrester has been disconnected; however, electrical service continues to be provided to the customer. In some utility systems, however, there is a requirement that, not only should a visible signal be given that an arrester has failed, but also a current carrying conductive path to system ground should be maintained until the failed arrester is removed and replaced. In this case, since an arrester most often fails in a shorted condition, a line-to-ground fault condition is maintained on the system resulting in system shutdown. Utility systems using this practice subsequently interrupt the provision of electric power on the faulted system until the failed arrester is located using instrumentation and visible indicators. The failed arrester must be removed and replaced before electric power service to customers can be restored.

SUMMARY OF THE INVENTION

Accordingly, the present invention both provides a visible signal that a surge arrester has failed and maintains a current carrying conductive path between the electric power distribution system and ground. The inventive surge arrester arrangement includes a first terminal, a second terminal and a third terminal. Arrester components are disposed between the first and second terminals and an insulating housing is provided to internally house the arrester components. A first connector electrically interconnects the second and third terminals. A disconnector automatically and electrically disconnects the first conductor from the second terminal, upon failure of the arrester components, to provide a visible indication of a failed surge arrester condition. A second current carrying conductor maintains a conductive path between the second and third terminals after disconnection of the first current carrying conductor in order to maintain a conductive path between the high voltage electric power distribution lines and system ground.

With respect to this arrangement, the visible failed arrester signal can be given either by disconnecting a current carrying conductor between the power distribution lines and the arrester or by disconnecting a current carrying conductor between the arrester and system ground. Accordingly, if the visible failed arrester signal is provided by disconnecting a current carrying conductor between the power distribution lines and the arrester, the first terminal of the surge arrester arrangement is connected to ground, the current carrying conductor providing the signal is connected between the second and third terminals, and the third terminal is connected to the power distribution lines. On the other hand, if the visible failed arrester signal is given by disconnecting a current carrying conductor between the arrester and ground, the first terminal is connected to the power distribution lines, the current carrying conductor providing the signal is connected between the second and third terminals, and the third terminal is connected to system ground.

BRIEF DESCRIPTION OF THE DRAWINGS

These and other novel features and advantages of the present invention will become apparent from the following detailed description of a preferred embodiment of the present invention taken in conjunction with the drawing in which.

DETAILED DESCRIPTION

Figure 1:
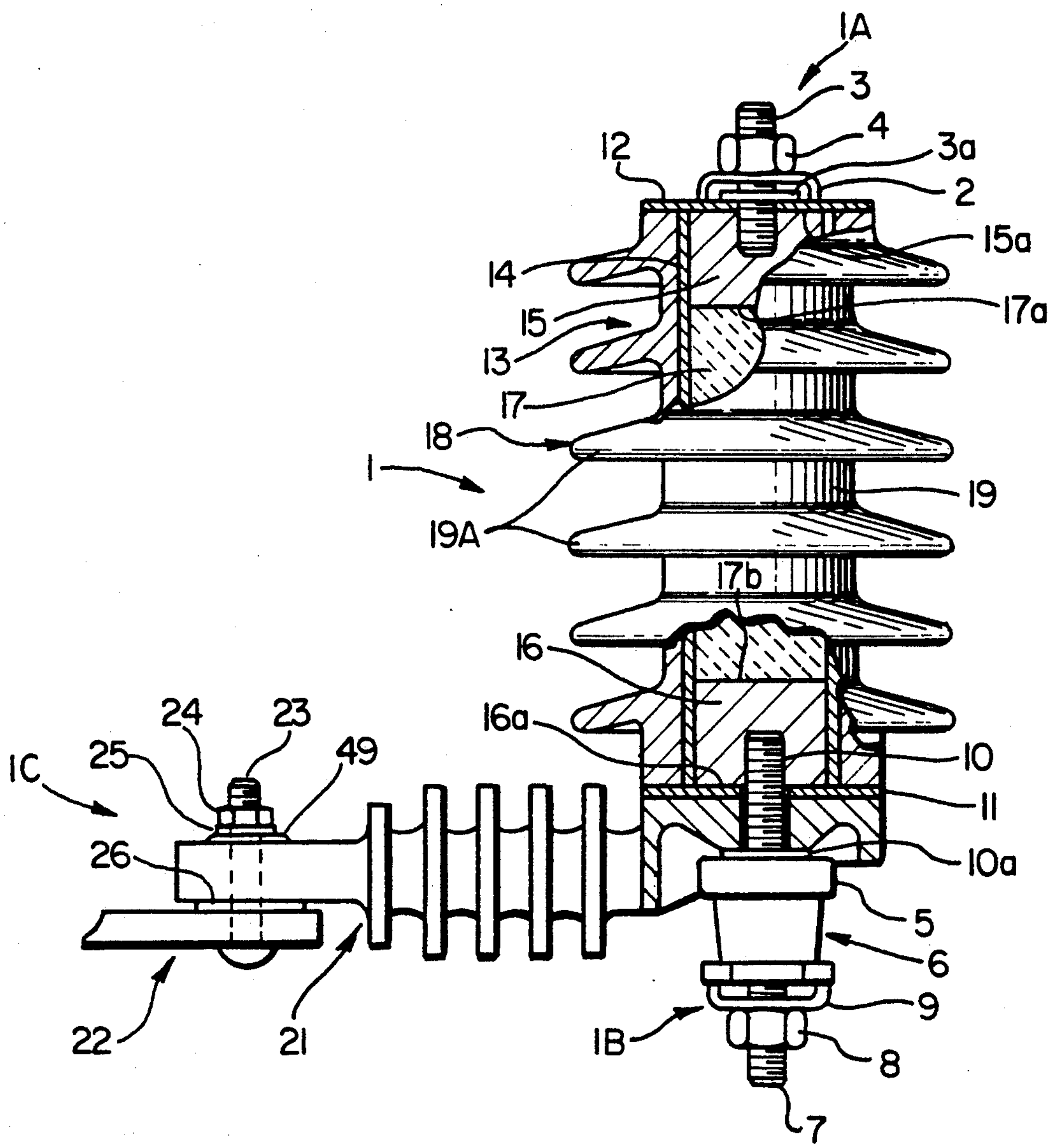
FIG. 1 PRIOR ART
FIG. 1 depicts one form of a conventional, prior art, high voltage surge arrester with which the present invention can be used.

A conventional, prior art high voltage surge arrester 1 (FIG. 1) has a terminal end 1A at which a conventional clamping device 2 and threaded nut 4 are disposed for electrically connecting the arrester 1 to a power line (not shown) of a high voltage (for example, from approximately 3000 volts through approximately 35000 volts or higher) electric power distribution system. The arrester 1 includes a terminal end 1B at which a clamping device 9 and threaded nut 8 are disposed for connecting the arrester 1 to ground through a ground lead (not shown). The arrester 1 also includes a body portion 18 and a conventional, prior art explosive ground lead disconnector 6 disposed at its terminal end 1B. The body portion 18 of the arrester 1, the disconnector 6, and a conventional, prior art insulative arrester support bracket 21 are interconnected firmly together by means of a threaded conductive stud 10. The arrester 1 is shown mounted to a grounded metal plate 22 at a terminal end 1C, by a carriage bolt 23, that extends through the insulative bracket 21, and by a threaded nut 24, a helical spring lock washer 25 and an external tooth lock washer 26. The arrester 1 is mounted firmly to the ground plate 22 by the tightening of the nut 24.

The body portion 18 of the arrester 1 includes arrester components 13 enclosed within an insulating, polymeric or porcelain housing 19 that includes a plurality of, preferably, integrally formed polymeric or porcelain weathersheds 19A. In a preferred embodiment, the housing 19 and its weathersheds 19A are formed from an elastomeric material. The arrester components 13 include a pair of spaced apart metallic spacers 15, 16 and a metal oxide arrester element 17, which may consist of one or more metal oxide arrester blocks disposed between and in electrical series contact with the metallic spacers 15, 16. The arrester components 13 may also include a relatively rigid insulative tube or wrapping 14, firmly attached to spacers 15 and 16, for retaining spacers 15 and 16 and the arrester element 17 together in series electrical contact.

The spacers 15 and 16 are centrally threaded to receive and engage the threads of respective threaded studs 3 and 10 which pass through central holes in metallic discs 11 and 12. The bracket 21 is attached to the arrester 1 by the engagement of the stud 10 with the ground lead disconnector 6. The apparatus shown in FIG. 1 is disclosed and more fully described in prior art, U.S. Pat. No. 4,972,291, incorporated herein by reference for all purposes.

When the arrester 1 is placed into service, the metal plate 22 may be electrically grounded by conventional means, not shown; and a ground lead, not shown in FIG. 1, will be connected between clamp 9 and carriage bolt 23. One end of a power line lead, not shown, will be connected in the clamp 2 and its other end to a power line of the high voltage electric power distribution system. As is well known, overvoltage surges on the power line to which arrester 1 is connected will be shunted through the arrester 1 and a ground lead (not shown) to the terminal end 1C and thus to system ground. If the arrester 1 fails, the disconnector 6 will explosively separate the ground lead from the arrester 1, thereby interrupting the current carrying conductive path to system ground. Accordingly, the electrical circuit from arrester 1 to ground is opened and the disconnected ground lead provides a visible signal that the arrester 1 has failed.

Figure 2:
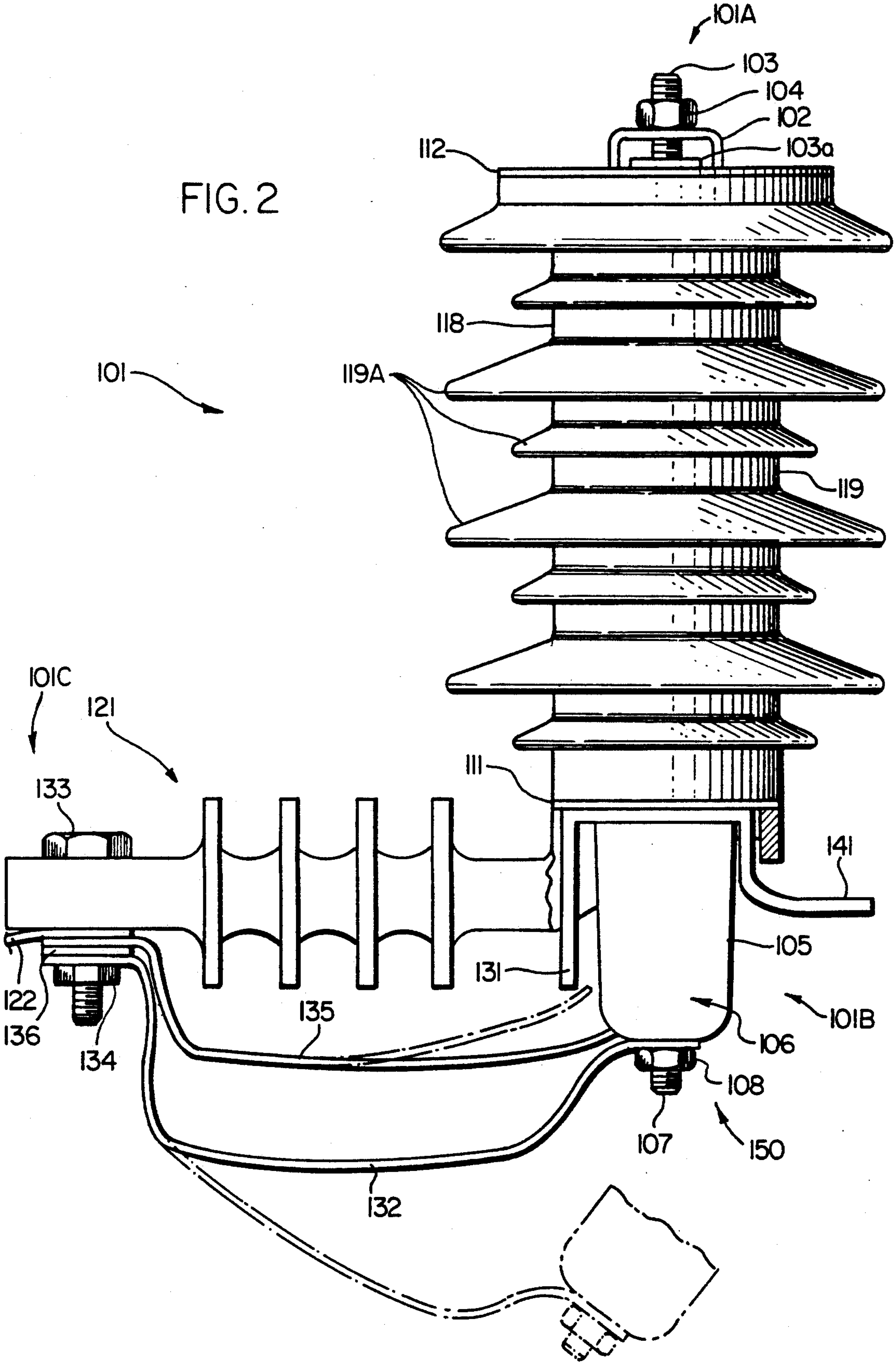
FIG. 2 depicts a high voltage surge arrester including a new and improved grounding mechanism, constructed in accordance with the principles of the present invention.

FIG. 2 depicts the inventive surge arrester 101, which is in essence of the same configuration and construction as the arrester 1 (FIG. 1) except the outer physical configuration of the weathersheds 119A is modified and, more importantly, the arrester 101 includes a new and improved grounding mechanism 150 for interconnecting its terminal end 101B to system ground at the terminal 101C. In accordance with an important feature of the present invention, the grounding mechanism 150 provides a visible signal that arrester 101 has failed while at the same time maintaining a current carrying conductive path to system ground after the arrester 101 has failed. Specifically, the grounding mechanism 150 includes a conductive contact member 131 electrically connected at the terminal end 101B between the conventional, prior art, qround lead explosive disconnector 106 and the conductive plate 111 that is in electrical contact with an internally disposed conductive connector stud used to secure the disconnector 106 to the internal arrester components of the arrester 101 (that is, a stud of the type depicted as stud 10 in FIG. 1). Alternatively, the conductive plate 131 can be placed between the disconnector 106 and the insulated support bracket 121 and in electrical contact with the aforementioned conductive connecting stud.

The mechanism 150 also includes a first, flexible ground lead (i.e. current carrying conductor) 132 and a second, resilient ground lead (i.e. current carrying conductor) 135. One end of the first ground lead 132 is in electrical contact with the disconnector 106 by way of the stud 107 and the nut 108. A second end of the first ground lead 132 is secured to the ground plate 122 by a bolt 133 and a nut 134. One end of the second, resilient ground lead 135, rests against a conventional insulating housing 105 of the disconnector 106 and the other end of the lead 135 is secured to the ground plate 122 at the terminal 101C. An optional washer 136 may be placed between second ends of first ground lead 132 and the second ground lead 135.

Accordingly, any overvoltage surges discharged through the arrester 101 will be connected to system ground through the first ground lead 132 and the ground plate 122. If the arrester 101 fails, the ground lead disconnector 106 will operate to explosively disconnect the first ground lead 132 from the second terminal end 101B of the arrester 101; and the lead 132 will fall into position 137 shown in phantom in FIG. 2. The second, resilient ground line 135 will spring into engagement with the contact member 131, thereby maintaining a current carrying conductive path between the power line and system ground through the arrester 101, the ground lead 135 and the ground plate 122. In its position 137 as shown in FIG. 2, the lead 132 provides a visible signal that the arrester 101 has failed and needs to be replaced. At the same time, the second ground lead 135 maintains the ground connection from the failed arrester 101 to the ground plate 122.

It is not necessary that the second ground lead 135 actually spring into physical contact with the contact member 131. An air gap may be left between the end of the contact member 131 and the end of the second ground lead 135. The air gap may be sized to break down and conduct at normal line-to-ground voltage, thus adding Radio Influence Voltage (RIV), which may be visually or audibly detected by a suitable instrument, to provide a detectable signal in addition to the already visible ground lead separation. An alternative, more suitable to United States practice, would be to size the air gap to withstand normal line-to-ground voltage, but to break down and arc over upon the presence of an overvoltage surge of at least a predetermined minimum level. An advantage of such an air gap is that electrical service to the customer can still be maintained, while providing the transformers and other distribution equipment with some protection from overvoltage surges.

Figure 3:
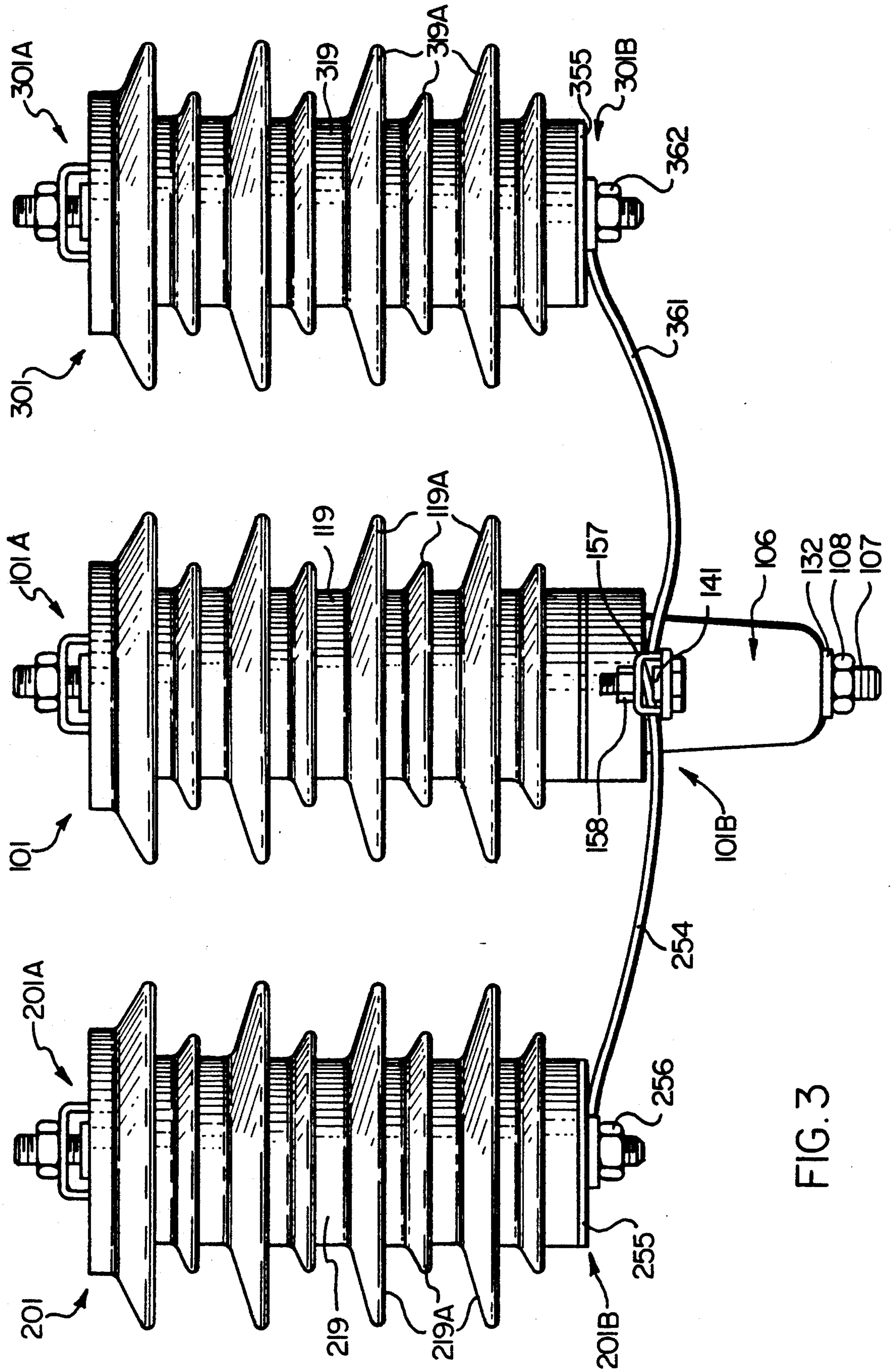
FIG. 3 shows the device of FIG. 2 in association with two additional high voltage surge arresters in a three-phase high voltage electric power distribution system.

The conducting contact member 131 may contain a terminal 141 for connection to other arresters such as in the multiple phase, specifically three phase, arrangement shown in FIG. 3. In FIG. 3, three arresters 101, 201 and 301 are shown. The arresters 201 and 301 are of the same type as the arrester 1 illustrated in FIG. 1, except that the arresters 201 and 301 do not have ground lead disconnectors. Instead, they share the ground lead disconnector 106 of the arrester 101. Accordingly, one end of the arrester 201 is connected to the terminal 141 by a ground lead 254. The ground lead 254 is connected at one end to a conductive plate 255 at the terminal end 201B of the arrester 201 and is held thereto by a nut 256. The lead 254 is also connected at its other end by a clamp 157 and a nut 158 to the terminal 141 of the contact member 131 of the arrester 101. Similarly, one terminal end 301B of the arrester 301 is electrically connected to the disconnector 106 by a ground lead 361. The ground lead 361 is connected at one end to a conductive plate 355 of the arrester 301 by a nut 362 and is connected at its other end to the terminal 141 of the contact member 131 by, for example, the clamp 157 and the nut 158.

The arrester 101 in the three phase arrangement of FIG. 3 utilizes the grounding mechanism 150 discussed above in connection with FIG. 2. Accordingly, the ground lead disconnector 106 provides the ground connection for all three arresters 101, 201 and 301. A failure of any one or more of the arresters 101, 201 and 301 will be sensed by the ground lead disconnector 106, resulting in the first ground lead 132 (FIG. 2) being explosively separated or disconnected from the terminal end 101B of the arrester 101, thereby opening or severing the current carrying conductive path to ground through the lead 132. The severed lead 132 provides a visible signal that one or more of the arresters 101, 201 and 301 have failed. However, the grounding mechanism 150 (in the specific embodiment depicted in FIG. 2) will maintain a current carrying conductive path between the three phase power lines to which the arresters 101, 201 and 301 are attached and the ground plate 122 by way of the second ground lead 135 (FIG. 2).

The ground lead disconnector 106 and the grounding mechanism 150 for the three arresters 101, 201 and 301 do not have to be attached to one of the arresters 101, 201 and 301 (FIG. 3) but can be held by a separate mounting structure apart from all three arresters 101, 201 and 301. In this arrangement, a ground lead, such as ground lead 254 or 361 (FIG. 3), is used to electrically connect the terminal end 101B of the arrester 101 to the separately mounted grounding mechanism 150.

Figure 4:
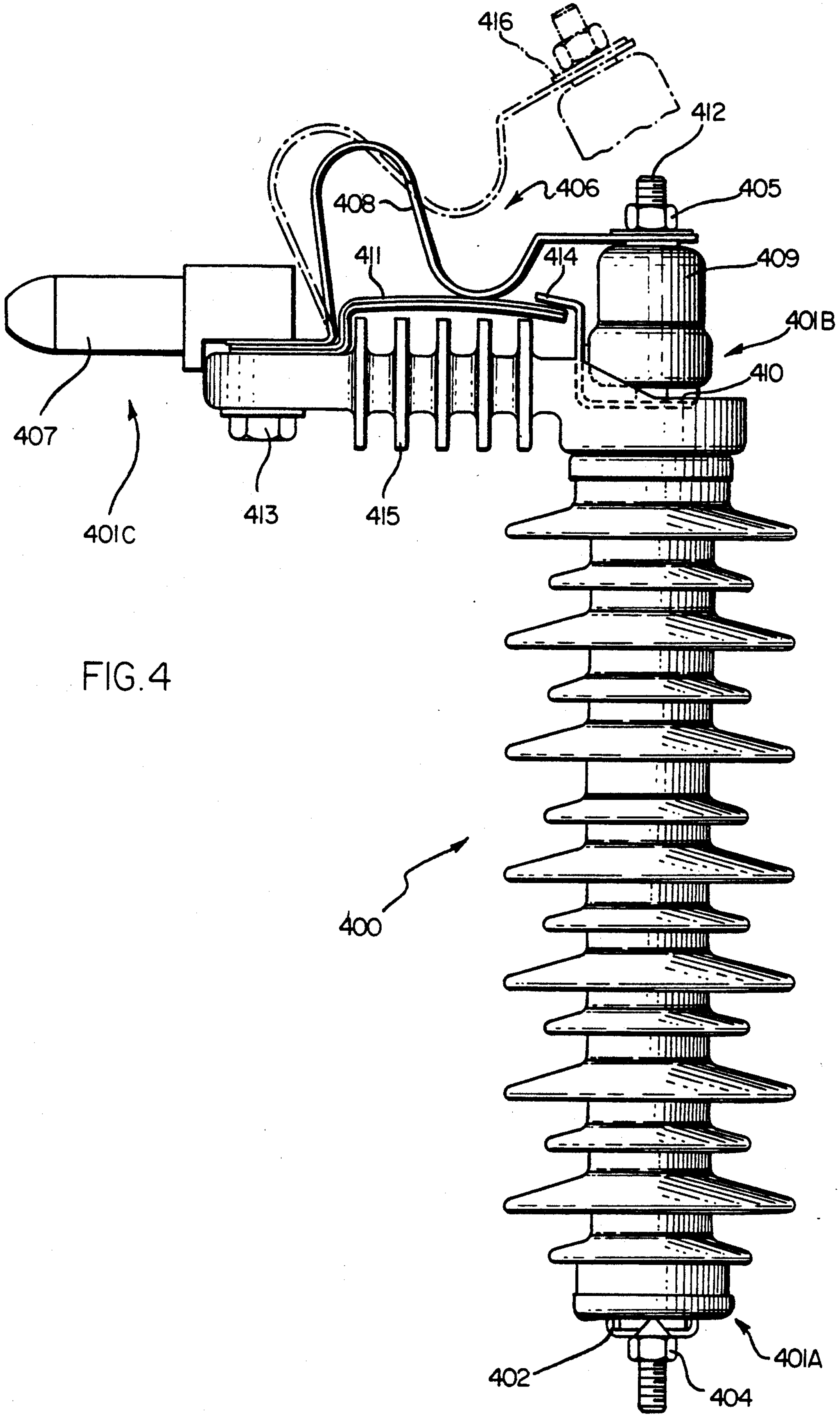
FIG. 4 depicts a high voltage surge arrester including a new and improved connection mechanism for connecting the arrester to a power distribution line in accordance with the principles of the present invention; and, FIG. 5 depicts a high voltage surge arrester including a new and improved alternative connection mechanism for connecting the arrester to a power distribution line in accordance with the principles of the present invention.

As shown in FIG. 4, the signaling of a failed arrester may be provided also by disconnecting a current carrying conductor between the power distribution lines and the arrester. Accordingly, arrester 400 has a terminal end 401A at which a conventional clamping device 402 and threaded nut 404 are disposed for electrically connecting arrester 400 to a system ground. The arrester 400 also includes terminal end 401B at which a clamping device in the form of a threaded nut 405 is disposed for connecting arrester 400 to one end of a new and improved power line connection mechanism 406. Mechanism 406 interconnects terminal end 401B of arrester 400 to terminal 401C which may have a male connector or probe 407 for connection to a power distribution line. In accordance with an important feature of the present invention, power line connecting mechanism 406 provides a visible signal that arrester 400 has failed while at the same time maintaining a current carrying conductive path between arrester 400 and the power distribution line after arrester 400 has failed.

Mechanism 406 includes a first, spring-like current carrying conductor 408 and a second, resilient current carrying conductor 411. Although not shown, current carrying conductor 411 may be protected by enclosing it within a guard or shrink tube. One end of current carrying conductor 408 is in electrical contact with disconnector 409 by way of stud 412 and nut 405. A second end of the first current carrying conductor 408 is secured to connector 407 by nut 413. One end of the second, resilient current carrying conductor 411 is biased away from flange end 414 of conducting plate 410 by the spring-like first current carrying conductor 408. The other end of second current carrying conductor 411 is secured to power line connector 407 by nut 413. Conductive plate 410 is in electrical contact with an internally disposed conductive connector stud used to secure disconnector 409 to the internal arrester components of arrester 400 (that is, a stud of the type depicted as stud 10 in FIG. 1). Arrester 400 may include the insulating housing and arrester blocks such as shown in FIGS. 1-3, and it may be supported in suitable fashion by insulating bracket 415. Second current carrying conductor 411 may be comprised of two laminations, one of copper and one of steel. The copper provides good current carrying conduction between terminal 401B and terminal 401C while the steel lamination provides resiliency.

Accordingly, any overvoltage surges discharged through arrester 400 will be connected to system ground through terminal 401C, first current carrying conductor 408, disconnector 409, arrester 400, terminal 401A and then the ground connection connected between ground at one end and terminal 401A at the other end. If arrester 400 fails, charged disconnector 409 will operate to explosively disconnect first current carrying conductor 408 from terminal 401B of the arrester 400; consequently, first current carrying conductor 408 will assume the phantom line position 416. When first current carrying conductor 408 separates from arrester 400, the force which it has exerted on second current carrying conductor 411 to maintain second current carrying conductor 411 in a position in which it does not contact extension 414 of conductor 410 is removed allowing contact between extension 414 and second current carrying conductor 411. Accordingly, a current carrying conductive path is maintained from connector 407 to terminal 401B through second current carrying conductor 411 and then to ground through arrestor 400 and terminal 401A.

Figure 5:
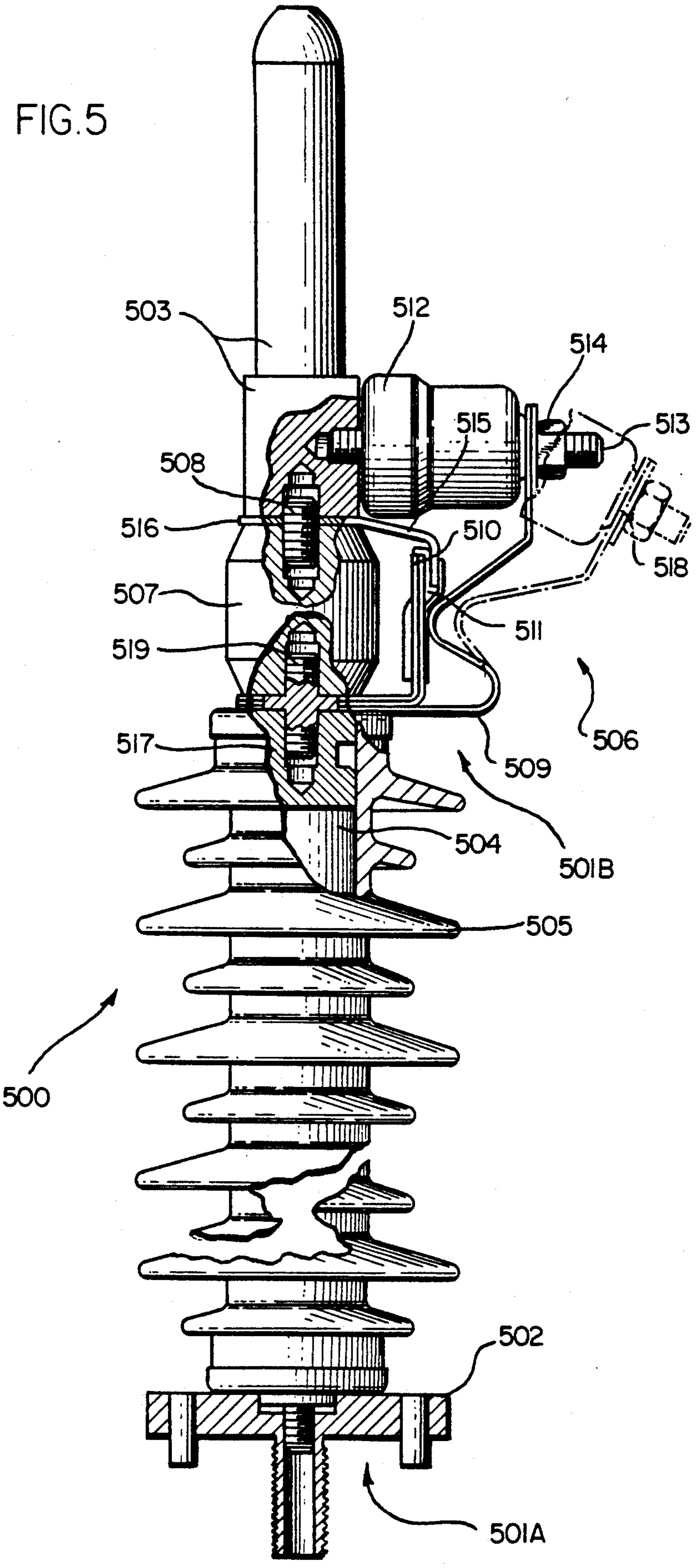

As shown in FIG. 5, the signaling of a failed arrester may again be provided by disconnecting a current carrying conductor between a power distribution line and the arrester. Accordingly, arrester 500 has a terminal end 501A at which a grounding plate 502 is disposed for electrically connecting the arrester blocks 504 of arrester 500 to a system ground and for providing a means for suitably supporting arrester 500 in proximity to the power distribution lines. The arrester 500 also includes terminal end 501B which is interconnected between the arrester blocks 504 of arrester 500 and a further terminal in the form of a hot line probe 503. Hot line probe 503 provides a means for connecting arrester 500 to one line of a power distribution system. Terminal end 501B includes a power line connection mechanism 506 having an insulator 507 which is attached both to arrester housing 505 by way of a cap stud 519 and to probe 503 by way of threaded stud 508. Studs 519 and 508 tightly clamp power line disconnection mechanism 506, probe 503 and arrester housing 505 together. In accordance with an important feature of the present invention, power line connecting mechanism 506 provides a visible signal that arrester 500 has failed while at the same time maintaining a current carrying conductive path between arrester 500 and the power distribution line after arrester 500 has failed.

Mechanism 506 includes a first, spring-like current carrying conductor 509 and a second, resilient current carrying conductor 510. Current carrying conductor 510 may be enclosed within a guard tube 511. One end of current carrying conductor 509 is in electrical contact with disconnector 512 by way of stud 513 and nut 514. A second end of the first current carrying conductor 509 is secured between insulator 507 and housing 505 by way of conducting stud 519 so that conductor 509 is electrically connected to arrester blocks 504 through conducting plug 517.

One end of the second, resilient current carrying conductor 510 is biased away from flange end 515 of conducting plate 516 by the spring-like first current carrying conductor 509. Conducting plate 516 is clamped between probe 503 and insulator 507 by way of stud 508; thus, conducting plate 516 is electrically connected to probe 503. The other end of second current carrying conductor 510 is secured between insulator 507 and arrester housing 505 by stud 519 so that conductor 510 is electrically connected to conductor 509 and to arrester blocks 504 through conducting plug 517. Arrester 500 may include the insulating housing 505 and arrester blocks 504 such as shown in FIGS. 1–3. Second current carrying conductor 510 may be comprised of two laminations, one of copper and one of steel. The copper provides good current carrying conduction between terminal 501B and probe 503 while the steel lamination provides resiliency.

Accordingly, any overvoltage surges discharged through arrester 500 will be connected to system ground through probe 503, disconnector 512, first current carrying conductor 509, arrester blocks 504, and then to ground through ground plate 502 at terminal end 501A. If arrester 500 fails, charged disconnector 512 will operate to explosively disconnect first current carrying conductor 509 from probe 503; consequently, first current carrying conductor 509 will assume the phantom line position 518. When first current carrying conductor 509 separates from probe 503, the force which it has exerted on second current carrying conductor 510 to maintain second current carrying conductor 510 in a position in which it does not contact extension 515 of conductor 516 is removed allowing contact between extension 515 and second current carrying conductor 510. Accordingly, a current carrying conductive path is maintained from probe 503, through second current carrying conductor 510 and arrester blocks 504, to ground. Whether grounding mechanism 150 or power line connection mechanisms 406 or 506 is used, a visible indication or signal of a failed arrester will be provided by a first current carrying conductor while a second current carrying conductor maintains a current path between the power line and ground. Accordingly, a line-to-ground fault condition is maintained on the power distribution system resulting in system shutdown. Utility systems using this practice will subsequently interrupt electric power on the power distribution system which has experienced the fault condition until the failed arrester is located and replaced. After the failed arrester has been replaced, electric power service to customers can be restored.

Also, conventional, commercially available ZQP arresters and P125 ground lead disconnectors, made and sold by the Joslyn Manufacturing Co. of Chicago, Ill., U.S.A., a wholly owned subsidiary of the assignee of the present invention, may be used in assembling the arresters in accordance with the principles of the present invention.

Other variations and modifications of the present invention are possible in light of the above teachings. Thus, it is to be understood that, within the scope of the appended claims, the invention may be practiced otherwise than as specifically described hereinabove. For example, the internally disposed arrester components of the arresters may include one or more conventional spark gaps electrically connected in series either with a metal oxide arrester element (for example, element 17 in FIG. 1) formed by one or more metal oxide arrester blocks or with a conventional silicon carbide arrester blocks.

We claim:

1. A high voltage surge arrester for protecting a high voltage electric power distribution system from damage due to overvoltage surges comprising:
- a first terminal;
- a second terminal;
- a third terminal;
- arrester components disposed between said first and second terminals;
- an insulating housing for internally disposing said arrester components;
- terminal connecting means for electrically interconnecting said second and third terminals, said terminal connecting means including a separable lead having first and second ends, said first end being electrically connected to said second terminal and said second end being electrically connected to said third terminal;
- disconnecting means for automatically and electrically disconnecting said separable lead from one of said second and third terminals upon failure of said arrester components to thereby provide a visible indication of a failed surge arrester condition; and,
- means for maintaining a current carrying conductive path between said second and third terminals subsequent to the operation of said disconnecting means and the electrical disconnection of said separable lead.

2. The high voltage surge arrester of claim 1 wherein said maintaining means comprises a current carrying conductor.

3. The high voltage surge arrester of claim 2 wherein said current carrying conductor comprises a resilient conductive lead.

4. The high voltage surge arrester of claim 2 wherein said disconnecting means comprises an explosive separable lead disconnector secured at said second terminal.

5. The high voltage surge arrester of claim 4 wherein said terminal connecting means comprises a conductive contact member disposed at said second terminal and forming part of said current carrying conductive path subsequent to said disconnection of said separable lead from said first terminal.

6. The high voltage surge arrester of claim 5 wherein said terminal connecting means further comprises conductive means disposed at said second terminal for conductively engaging at least one conductive lead from at least one separately disposed high voltage surge arrester.

7. The high voltage surge arrester of claim 2 wherein said disconnecting means comprises an explosive separable lead disconnector secured at said third terminal.

8. A high voltage surge arrester for protecting a high voltage electric power distribution system from damage due to overvoltage surges comprising:

terminal means having at least first and second terminals;

arrester components disposed between said first and second terminals;

an insulating housing for internally housing said arrester components;

a first current carrying conductor having first and second ends, said first end being electrically connected to said terminal means for providing a current carrying path with respect to said terminal means, and said second end being electrically captured in a fixed position;

disconnecting means for automatically and electrically disconnecting said first current carrying conductor upon failure of said arrester components to thereby provide a visible indication of a failed surge arrester condition; and, means, including a second current carrying conductor, for maintaining said current carrying path with respect to said terminal means subsequent to the operation of said disconnecting means and the electrical disconnection of said first current carrying conductor.

9. The high voltage surge arrester of claim 8 wherein said disconnecting means comprises an explosive disconnector for disconnecting said first current carrying conductor upon failure of said arrester components.

10. The high voltage surge arrester of claim 9 further comprising a conductive contact member for making contact with said second current carrying conductor after said explosive disconnector disconnects said first current carrying conductor upon failure of said arrester components.

11. The high voltage surge arrester of claim 10 wherein said second current carrying conductor comprises a resilient conductive lead.

12. A high voltage surge arrester system for protecting a high voltage electric power distribution system from damage due to overvoltage surges comprising:

a high voltage surge arrester including a first terminal for conducting overvoltage surges to ground, a second terminal, arrestor components disposed between said first and second terminals, said arrester components including an arrester element formed of one or more arrester valve blocks, and an insulating arrester housing for said arrester components, said one or more arrester valve blocks being internally disposed within said insulating arrester housing; and, power line connecting means for electrically connecting said second terminal to said power line, said power line connecting means including first conductive means electrically connected to said second terminal for forming a first current carrying conductive path between said second terminal and said power line and for providing a signal in response to the failure of said arrester, said first current carrying conductive path being severable upon the failure of said arrester components, disconnector means for automatically severing said first current carrying conductive path of said first conductive means upon failure of said arrester components, and means for maintaining a second current carrying conductive path between said second terminal and said power line upon severing said first current carrying conductive path.

13. The high voltage surge arrester of claim 12 wherein said first conductive means comprises a first power line lead being connected between said second terminal and a third terminal adapted to be electrically connected to said power line.

14. The high voltage surge arrester of claim 13 wherein said disconnector means comprises an explosive power line lead disconnector, said first power line lead being operatively connected to said explosive power line lead disconnector such that, upon operation of said explosive power line lead disconnector, said first current carrying conductive path through said first power line lead is severed.

15. The high voltage surge arrester of claim 14 wherein said means for maintaining said second current carrying conductive path comprises a second power line lead having one end electrically connected to one of said second and third terminals and another end physically disposed at the other of said second and third terminals.

16. The high voltage surge arrester of claim 14 wherein said explosive power line lead disconnector is physically disposed at said second terminal.

17. The high voltage surge arrester of claim 14 wherein said explosive power line lead disconnector is physically disposed at said third terminal.

18. The high voltage surge arrester of claim 12 wherein said one or more arrester valve blocks comprise one or more metal oxide arrester blocks.

19. The high voltage surge arrester of claim 12 wherein said arrester components include one or more spark gaps.

20. The high voltage surge arrester of claim 12 wherein said one or more arrester valve blocks comprise one or more silicon carbide arrester blocks and wherein said arrester components include one or more spark gaps.

21. The high voltage surge arrester of claim 12 wherein said means for maintaining said second current carrying conductive path includes an air gap adapted to be electrically disposed in series between said second terminal and said power line.

22. A method of providing surge protection for a high voltage electric power distribution system comprising the following steps:

conducting high voltage surges on a power line to ground by way of a high voltage surge arrester adapted to be electrically connected between said power line of said high voltage power distribution system and system ground;

electrically disconnecting a first current carrying conductive path between said power line and said system ground through said high voltage surge arrester upon the occurrence of a failure of said high voltage surge arrester in order to provide a visible indication of a failed surge arrester, and establishing a second current carrying conductive path between said power line and said system ground through said high voltage surge arrester upon the disconnection of said first current carrying conductive path to thereby maintain a current carrying conductive path between said power line and said system ground upon failure of said surge arrester.

23. A high voltage surge arrester system for protecting a high voltage power distribution system from damage due to overvoltage surges comprising:

a high voltage surge arrester including (a) a first terminal for connection to a high voltage power line of a high voltage power distribution system, (b) a second terminal, (c) arrester components disposed between said first and second terminals, said arrester components including an arrester element formed by one or more arrester valve blocks, and (d) an insulating arrester housing for said arrester components, said one or more arrester blocks being internally disposed within said housing; and grounding means for electrically connecting said second terminal to system ground of said power distribution system, said grounding means including (e) first conductive means electrically connected to said second terminal for forming a first current carrying conductive path between said second terminal and said system ground, for conducting said overvoltage surges to system ground, and for providing a signal in response to the failure of said arrester, said first conductive means being severable upon the occurrence of failure of said arrester components, (f) disconnector means for automatically disconnecting said first conductive means to sever said first current carrying conductive path upon failure of said arrester components, and (g) means for maintaining a second current carrying conductive path between said second terminal and said system ground upon the severing of said first current carrying conductive path.

24. A high voltage surge arrester system as recited in claim 23 wherein said first conductive means comprises a first ground lead, one grounded end of said first ground lead being connected to a third terminal adapted to be electrically connected to said system ground.

25. A high voltage surge arrester system as recited in claim 24 wherein said disconnector means comprises an explosive ground lead disconnector, one end of said first ground lead being operatively connected to said ground lead disconnector such that upon operation of said ground lead disconnector said first current carrying conductive path through said first ground lead is severed.

26. A high voltage surge arrester system as recited in claim 25 wherein said second current carrying conductive path maintaining means comprises a second ground lead having a first end electrically connected to one of said second and third terminals and a second end physically disposed at the other of said second and third terminals.

27. A high voltage surge arrester system as recited in claim 25 wherein said ground lead disconnector is physically disposed at said second terminal.

28. A high voltage surge arrester system as recited in claim 25 wherein said ground lead disconnector is physically disposed at said third terminal.

29. A high voltage surge arrester system as recited in claim 23 wherein said one or more arrester blocks comprise one or more metal oxide arrester blocks.

30. A high voltage surge arrester system as recited in claim 23 further comprising a second high voltage surge arrester and a third high voltage surge arrester, said first mentioned high voltage surge arrester, said second surge arrester and said third surge arrester being operatively connected to said disconnector means for enabling the operation of said disconnector means upon failure of one or more of said surge arresters.

31. A high voltage surge arrester as recited in claim 30 further comprising conductive means for maintaining one end of each of said second and third surge arresters electrically connected to said second terminal both before and after the severing of said first current carrying conductive path.

32. A high voltage surge arrester as recited in claim 23 wherein said second current carrying conductive path maintaining means includes an air gap adapted to be electrically disposed in series between said second terminal end and said system ground.

* * * * *